Figure 1:
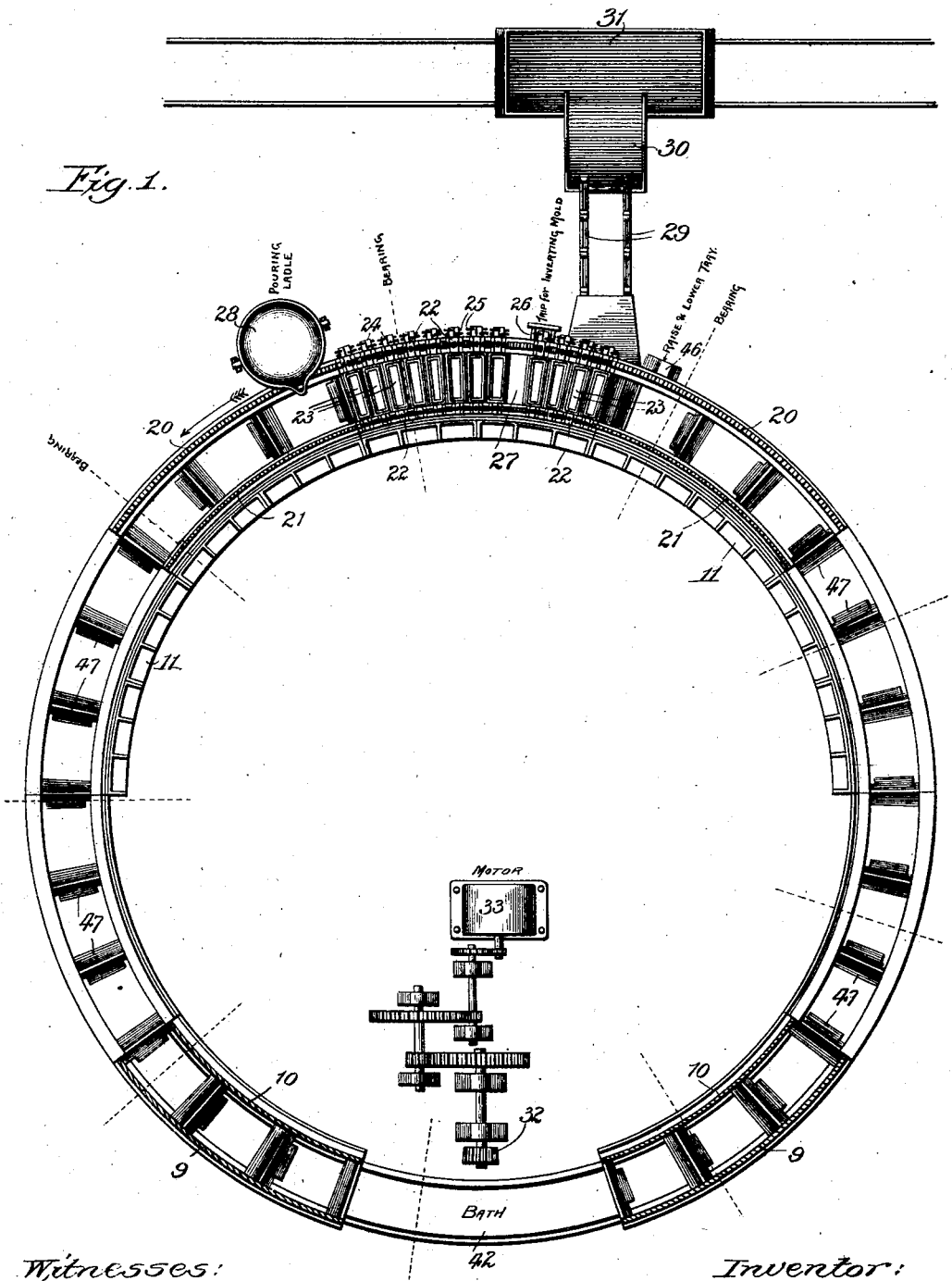

No. 758,660. PATENTED MAY 3, 1904.
W. T. JAMES.
APPARATUS FOR MAKING CASTINGS.
APPLICATION FILED MAY 13, 1902.
NO MODEL. 5 SHEETS—SHEET 1.

No. 758,660. PATENTED MAY 3, 1904.
W. T. JAMES.
APPARATUS FOR MAKING CASTINGS.
APPLICATION FILED MAY 13, 1902.
NO MODEL. 5 SHEETS—SHEET 2.
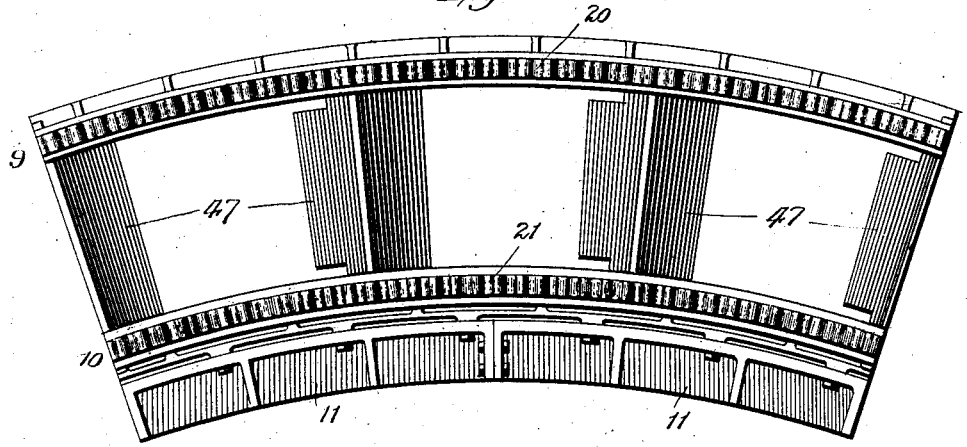
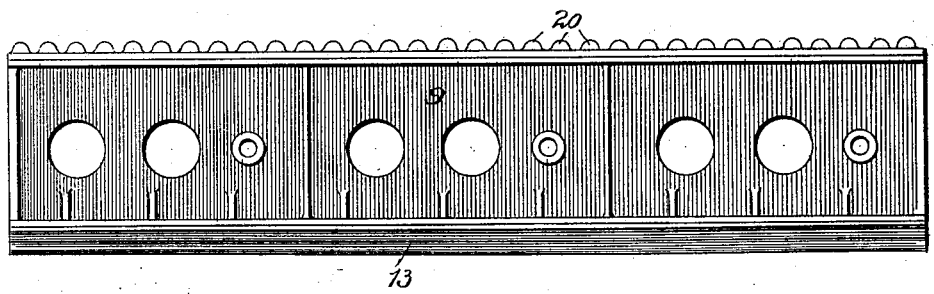
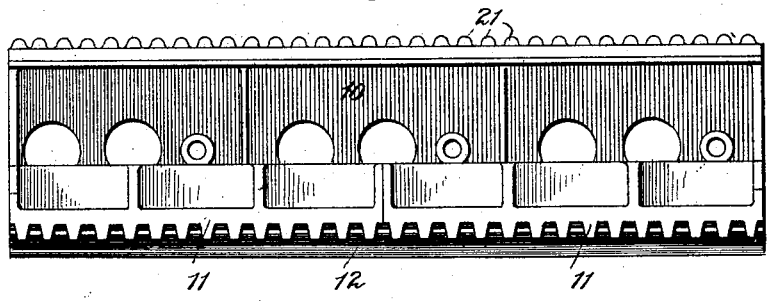
Witnesses:
Inventor:
William T. James
by atty
Paul Synnestvedt No. 758,660. PATENTED MAY 3, 1904.
W. T. JAMES.
APPARATUS FOR MAKING CASTINGS.
APPLICATION FILED MAY 13, 1902.
NO MODEL. 5 SHEETS—SHEET 3.

Witnesses:
Inventor:
William T. James
by atty.

No. 758,660. PATENTED MAY 3, 1904.
W. T. JAMES.
APPARATUS FOR MAKING CASTINGS.
APPLICATION FILED MAY 13, 1902.
NO MODEL. 5 SHEETS—SHEET 4.
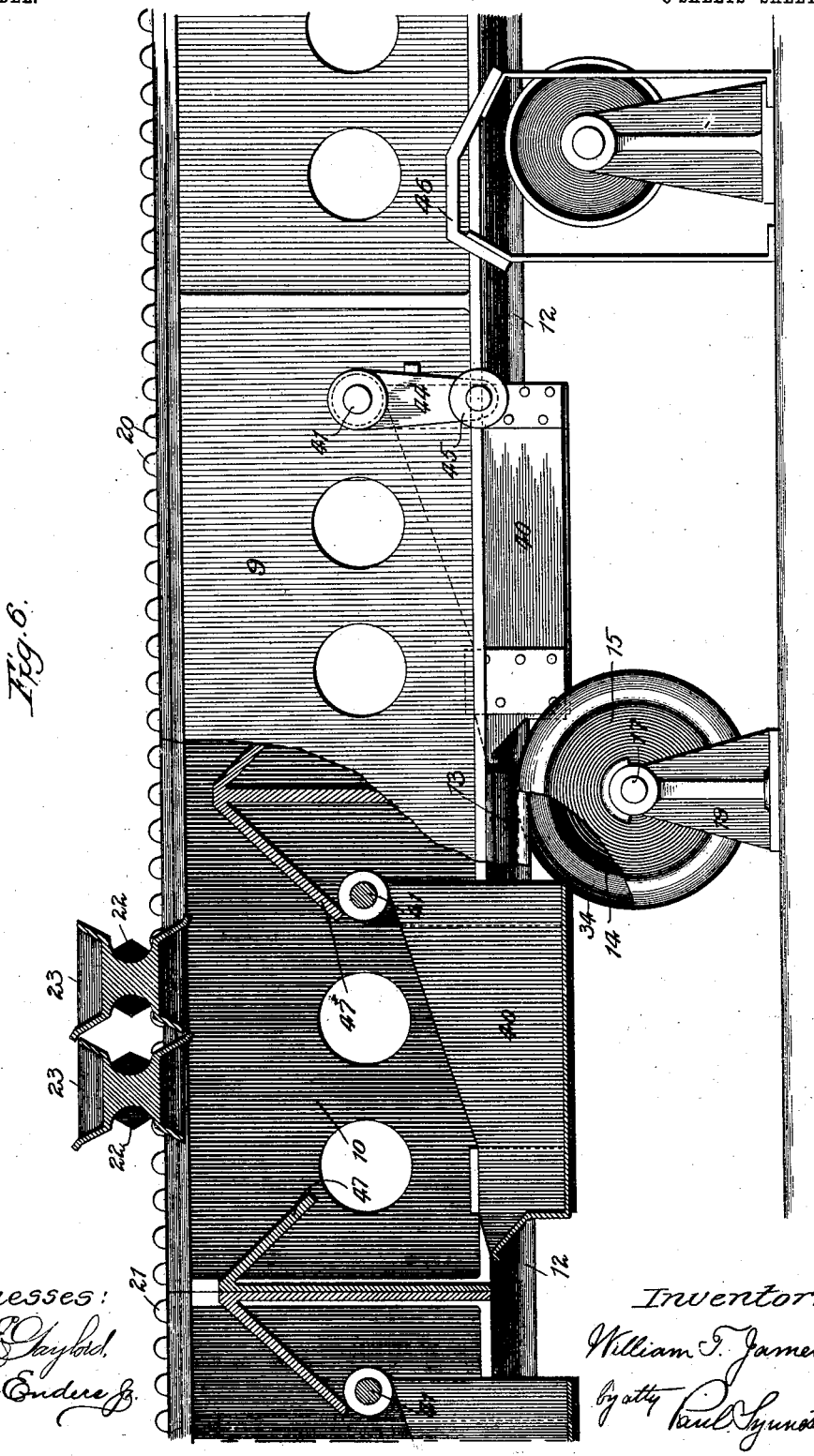

No. 758,660. PATENTED MAY 3, 1904.
W. T. JAMES.
APPARATUS FOR MAKING CASTINGS.
APPLICATION FILED MAY 13, 1902.
NO MODEL. 5 SHEETS—SHEET 5.
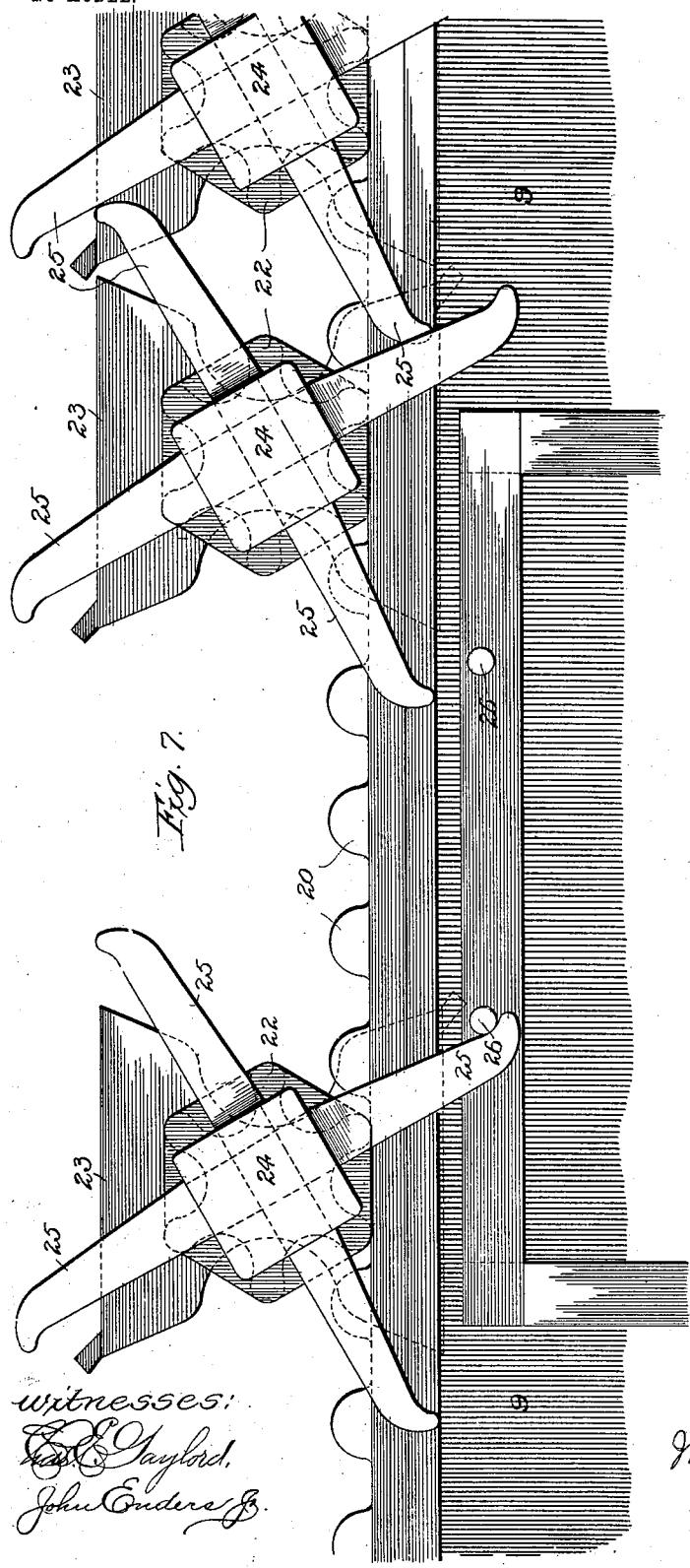
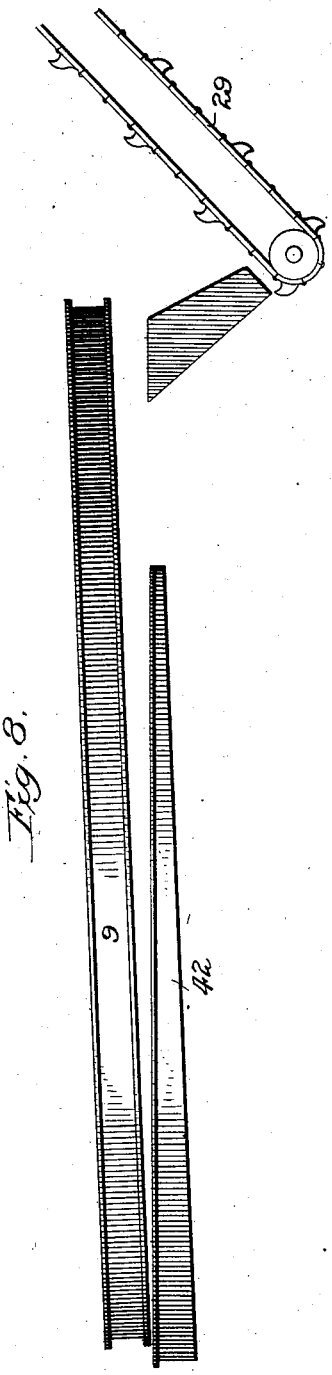

No. 758,660. Patented May 3, 1904.

UNITED STATES PATENT OFFICE.

WILLIAM T. JAMES, OF CHICAGO, ILLINOIS.

APPARATUS FOR MAKING CASTINGS.

SPECIFICATION forming part of Letters Patent No. 758,660, dated May 3, 1904.

Application filed May 13, 1902. Serial No. 107,102. (No model.)

*To all whom it may concern:*

Be it known that I, WILLIAM THOMAS JAMES, a citizen of the United States of America, residing in Chicago, county of Cook, and State of Illinois, have invented certain new and useful Improvements in Apparatus for Making Castings, of which the following, taken in connection with the accompanying drawings, is a specification.

This invention has for its primary object the provision of an apparatus for making castings, where a large number of castings of like configuration are to be made, as for example, in the casting of pig iron, and whereby such apparatus will be practically automatic and continuous in its operation, and will form such castings at a minimum cost, and with maximum rapidity, and which at the same time can be constructed in a space much less than has been required for mechanism of this class heretofore made, which is familiar to me.

A further object of this invention is the provision of an apparatus of the type specified, in which may be employed two connected concentric rings, in combination with wheel supports for such rings, so that the rings may revolve about a center which will be free from spokes or other connections, thus permitting the use of driving mechanism in such central space, which can be readily geared to such rings from such location.

A further object of this present invention is the provision of an apparatus of the kind referred to, in which two concentric connected rings are employed carrying double molds mounted between the rings, on gears which engage suitable racks upon the upper surface of the rings, and which by means of suitable inverting mechanism, operate to turn the molds upside down, so as to dump the contents thereof at a certain predetermined point.

Still another object of this invention is the construction of the apparatus last above described, in combination with mechanism for receiving the castings after they are formed, and automatically lowering them into a cooling bath, and afterward taking them out of such bath and placing them in conveying mechanism which carries them to their immediate destination.

Figure 5:
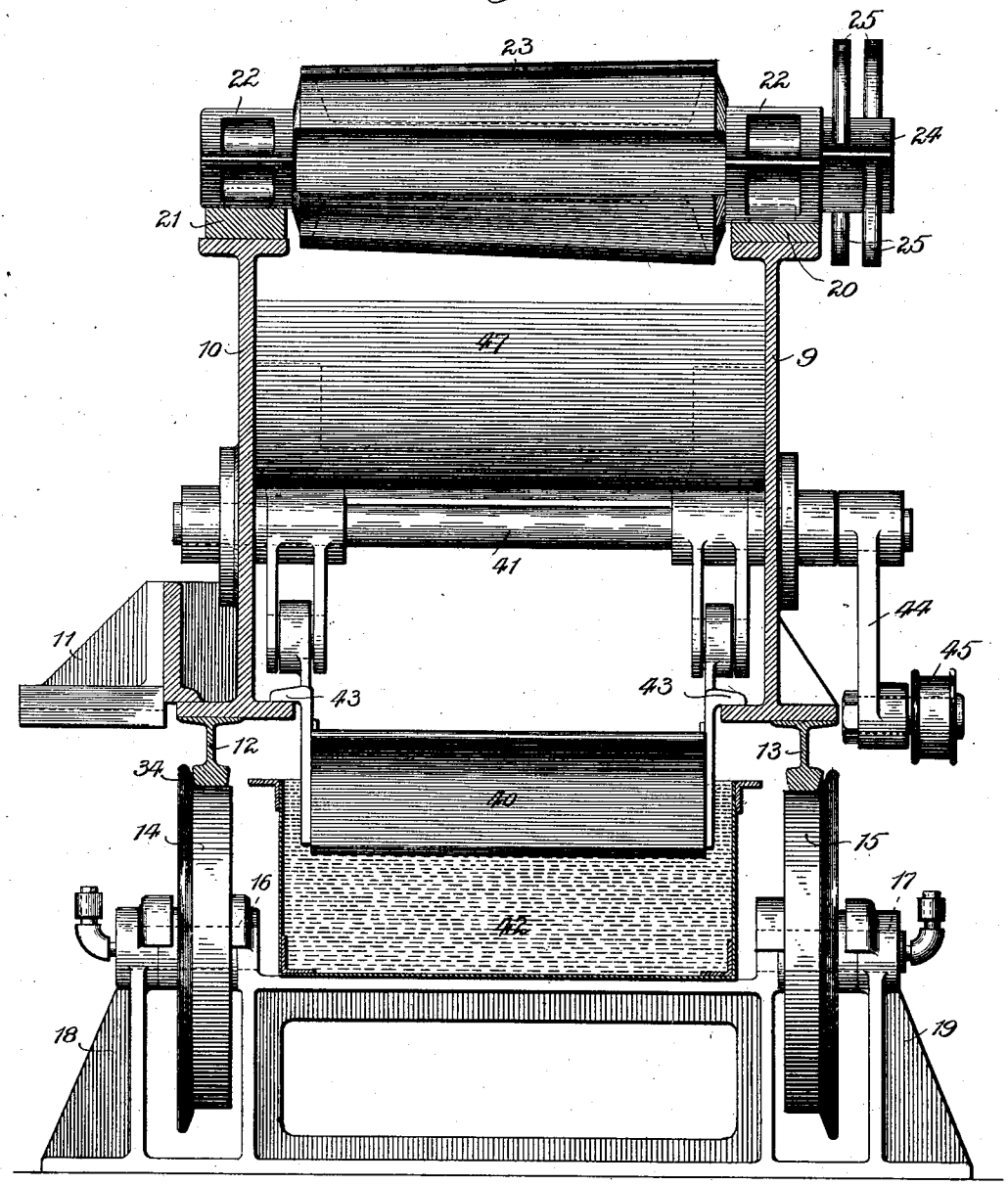

The above, as well as such other objects as may hereinafter appear, I attain by means of a construction which I have illustrated in preferred form in the accompanying drawings, in which Figure 1 is a plan view of an apparatus embodying my improvements, omitting part of the rack, the receiving trays, and most of the molds, for clearness, Figure 2 is a plan view of a section of the apparatus shown in Figure 1, drawn on a larger scale, Figure 3 is a side elevation showing a section of the apparatus upon the outside, that is, showing the outside ring, Figure 4 is a like view of the inside ring and the driving rack attached thereto, Figure 5 is a transverse vertical sectional view through the two concentric rings, showing the relative arrangement of the same and the mounting of them upon suitable wheel supports, Figure 6 is a view of a certain portion of the mechanism showing the location of the invertible molds on the top of the rings, and the trays designed to catch the castings as they are dumped out of the molds, and mechanism for operating the trays to raise and lower the same into and out of the cooling bath, Figure 7 is an enlarged view showing the method of mounting the invertible molds upon the gears or tooth racks on the upper side of the concentric rings, and the shifting mechanism employed for inverting the said molds, and Figure 8 is a view indicating diagrammatically an outside elevation of the rings mounted in a somewhat inclined or sloping plane, in conjunction with the mechanism employed for carrying off the castings or pigs after they are finished.

Referring now particularly to Figures 1 and 5, it will be seen that in carrying out my invention I provide first two concentric rings marked respectively 9 and 10, the inner one 10 having secured near the lower edge thereof a rack 11, which is adapted to engage with suitable driving mechanism hereinafter to be more particularly described. The rings as shown are preferably formed of I-shape in cross section, and can be made of some structural steel material, and are supported below by rails 12 and 13, which rest upon wheel supports 14 and 15, carried in axles 16 and 17, that are journaled in brackets or pedestals 18 and 19, as shown. As many of these wheel supports may be employed as desired. I have indicated by dotted lines in Figure 1 the use of ten such bearings.

On the upper edges of the rings 9 and 10 are mounted racks 20 and 21, upon which rest the gears 22, which carry the double molds 23 in the manner shown, the shafts or central portions of the axles upon which the gears are mounted extending to the outside of the ring 9, as indicated at 24, and being provided with projections 25, adapted to engage stop pins 26, fixed in certain predetermined places, when it is desired to invert the molds. The molds are placed close together all the way around the rings, as indicated in Figure 1 for a portion of the circumference of the ring, which is all that is thought necessary therein to show, except that at one point there is a space left between two adjacent molds, as for example at the place marked 27, which is substantially the same in width as the width required for the inversion of a mold, or equal to the width of one mold. The purpose of this space is to permit the molds each in turn to be inverted by the stop pins 26, when they come around in the revolution of the rings to a point where the projections 25 engage the stop pin, it being evident that so long as the molds are placed together, as shown, they cannot be inverted except as they come to this position.

28 indicates a pouring ladle arranged adjacent to the rings, so as to pour the metal into the molds, and 29 indicates carrying devices for taking the castings after they are formed and delivering them into the chute 30, which in turn empties into the car or other transferring apparatus 31.

The rack 11 which is secured to the inner ring 10 is adapted to engage with the pinion 32, which is in turn, through a series or chain of gears, driven by means of the motor 33, which mechanism all can be placed within the center of the two concentric rings, since there are no spokes or other cross connections upon the inside of the inner ring, the rings being guided around in their circular path by means of the flanges 34, on the wheel supports 14.

The space between the rings along the lower part thereof, is provided with a plurality of receiving trays 40 pivoted on shafts 41, as indicated in Fig. 6, so that they can be raised and lowered to be brought out of or let down into the cooling bath 42, shown in Figure 5. When in position in the cooling bath they rest upon the lateral projection 43, but when raised are carried by means of the shafts 41. The shafts 41 extends outside of the outer ring 9, and carry upon their outer ends arms 44, which are provided with rollers 45 in the nature of tappets that are made to engage with a projection bearing face 46, in a certain portion of the travel of the rings, so as to raise and lower the receiving trays 40 when required. In order to insure the falling of the castings into these receiving trays guard flanges or walls 47 are provided, as shown, in Figure 6.

The operation of my invention is substantially as follows:

The rings being set in motion by means of the motor 33, are caused to revolve continuously around upon the wheel supports, while the metal is poured from the pouring ladle 28 into the molds which project upwardly, the molds then traveling around until they come to the space marked 27, where the tripping stops 26 are placed, which engage the arms 25, and by means of the gears 22 engaging the racks 20 and 21, serve to invert the molds, at the same time that the molds are advanced the width of one mold, that is, into position adjacent to the next mold forward of the one inverted, each mold in turn being turned upside down by this means at this same place, and dumping or discharging its contents into the receiving tray immediately under it, which is then caused automatically to operate by means of the mechanism indicated in Figures 5 and 6, to raise until it reaches the cooling bath, when it is lowered into the said bath and continues to travel around in the cooling bath until near the end thereof, when like mechanism, operating on the arm 44 and tappet 45, raises the receiving tray out of the cooling bath, and causes the contents of the tray to be dumped by sliding down onto the conveyer 29, which carries the casting up and discharges it onto the chute 30. Thus the operation of my invention is not only continuous, but is in all respects automatic, since the metal as it is poured into the molds forms the casting therein, and the molds are automatically inverted, the casting falling into the receiving tray which is then automatically brought into contact with the cooling bath, and then again automatically lifted out of the cooling bath, and the receiving tray is so operated as to dump the contents thereof onto a conveyer which delivers the casting into the point or receptacle intended for it.

The advantage of the mounting of the invertible molds on the gears and rack as shown will now be apparent, since it is evident that by this arrangement the molds can be placed together as shown, and by leaving but the room of one space between adjacent molds at one point around the circumference of the two concentric rings the molds can be inverted by the tripping mechanism as already described, and this does not require that the molds shall be separated from each other a distance sufficient to permit the inversion independently of each one. Thus a very large amount of space is saved, making it possible to put a given number of molds on a very much smaller pair of rings, than is possible where molds of this character are mounted on trunnions carried on revolving wheels or tables, as has been proposed in the devices of the prior art known to me.

Having thus described my invention, what I claim as new, and desire to secure by Letters Patent, is—

1. In casting apparatus the combination with a pair of movable circular racks and means for moving the same, of a series of reversible molds mounted upon said racks, resting upon pinions on said racks, and means for inverting said molds by rolling them on said pinions.

2. The combination of two traveling concentric racks, a series of invertible molds mounted to roll upon said racks, and means for moving the racks and for dumping the molds, substantially as described.

3. A casting apparatus comprising in combination two connected concentric rings, wheel supports for said rings, and invertible molds mounted between said rings, upon gears engaging racks upon the upper surfaces of said rings, substantially as described.

4. A casting apparatus comprising in combination invertible molds carried upon gears, and racks for supporting said molds, substantially as described.

5. A casting apparatus comprising in combination invertible molds carried upon gears, circular racks for supporting said molds, and mechanism for inverting said molds, substantially as described.

6. A casting apparatus comprising in combination two concentric connected rings, a plurality of molds mounted upon said rings, arranged adjacent to each other, but with one space equal to the width of one mold left vacant, gears carrying said molds, racks carrying said gears, and mechanism for inverting the molds when the same reach the point where the tripping apparatus is located, substantially as described.

7. The combination with a pair of circular rings carrying a series of invertible molds thereon, means for inverting the molds, a series of trays pivoted in the rings under the said molds to receive the contents of the same, a partially circular cooling-tank for water under said trays, and means for automatically raising the said trays and lowering them to dip the trays in the cooling tank as the said rings are revolved, substantially as described.

8. The combination with a traveling circular support, a series of invertible molds resting upon said support and rolling thereon to invert the same and to progress along the surface of the same, in combination with a cooling bath under said support and a series of dipping trays with means for dipping said trays into said cooling bath, and a series of guide flanges to direct the contents of the molds into said trays.

9. In casting apparatus the combination of a ring provided with a rack, a continuous series of molds having pinions on their axes and placed in juxtaposition on said rack with a space at one point of the ring between the molds, and means for inverting the molds by rolling them on the rack.

10. In casting apparatus the combination with a rack for supporting a mold, of a mold provided with an axis having a toothed pinion to roll upon said rack, and means by which the mold is inverted by tripping it and rolling it forward on the rack.

11. In casting apparatus the combination with a movable circular ring support for a series of molds, of a mold thereon mounted upon a rack and provided with an axis having a pinion and means for inverting the mold by rolling it forward on the rack in the direction of motion of the rack.

12. In molding apparatus the combination with a continuous movable ring carrier, of a series of invertible molds mounted to roll upon said ring and means for tripping the said molds, the molds being in contact with each other continuously around the circumference of said ring except at one point, where there is a space by which a mold may turn over without disturbing the other molds.

13. In casting apparatus the combination with a revolving carrier ring provided with racks on its upper surface, of a series of molds resting upon said racks and provided with pinions coöperating therewith and with tripping means to invert the molds at a particular point of their travel around the ring.

14. In casting apparatus a mold provided with a tripping device and a journal having a gear thereon in combination with a toothed rack for bearing and tripping said gear to invert the mold.

15. In casting apparatus the combination with a traveling open centered ring support, a series of invertible molds thereon, a series of receiving trays carried by said ring and means attached to the ring for dipping the said trays in a cooling bath and raising them again, substantially as described.

16. In casting apparatus the combination with a continuous moving open centered double ring carried upon fixed rollers and provided with a circular rack for driving the same, a series of invertible molds mounted upon the top of said ring and supported upon a rack upon said ring, said molds being provided with pinions, and said ring being provided with tripping means whereby the molds are tripped, carrying trays supported upon said ring and having means for raising and lowering the same, and a circular tank for the purpose of dipping and cooling said trays, substantially as described.

17. In casting apparatus the combination with a traveling circular toothed rack for bearing a series of molds, of a mold thereon having two like sides and being provided with a shaft having a gear wheel whereby the mold is inverted by rolling on said rack, and stationary means for revolving the shaft of the mold for the purpose of inverting the same.

In testimony whereof I have hereunto set my hand in the presence of two subscribing witnesses.

WILLIAM T. JAMES.

Witnesses:
PAUL CARPENTER,
PHILIP J. FINNEGAN.